FILLER VALVE

Original Filed June 6, 1968

Inventors:
William A. Etter
Wendell L. Seaman
By Bair, Freeman & Molinare
Attys.

United States Patent Office

Re. 27,564
Reissued Jan. 23, 1973

27,564
FILLER VALVE

William A. Etter, Marshalltown, Iowa, and Wendell L. Seaman, Allen, Tex., assignors to Fisher Controls Company, Inc., Marshalltown, Iowa Original No. 3,542,063, dated Nov. 24, 1970, Ser. No. 735,106, June 6, 1968. Application for reissue July 21, 1971, Ser. No. 165,795
Int. Cl. F16k *15/06*
U.S. Cl. 137—512.3 7 Claims

Matter enclosed in heavy brackets [ ] appears in the original patent but forms no part of this reissue specification; matter printed in italics indicates the additions made by reissue.

ABSTRACT OF THE DISCLOSURE

A filler valve for a pressure container provided with a first seating means comprising a replaceable valve seat and a fixed valve seat. A first valve member carried on a valve stem is adapted to normally seat against the replaceable valve seat, however, when the replaceable valve seat is removed for repair or replacement, the first valve member seats against the second valve seat. The valve stem is elongated and carries a second valve member thereon adapted to seat against second seating means. The valve stem is constructed and arranged to permit long travel of the second valve member on the valve stem to provide improved flow capacity and spray filling of the pressure container.

BACKGROUND OF THE INVENTION

This invention relates to a filler valve and, more particularly, to an improved filler valve providing communication to the interior of a pressure container for containing fluids such as liquefied petroleum gas (LP-gas), anhydrous ammonia, and the like, which fluids are a vapor at ambient conditions and a liquid at various other combination, pressures and temperatures.

Filler valves are known which comprise a two-piece valve body having a flow passage therein. Fluid flow through the valve body is controlled by an upper spring-biased valve and a lower spring-biased valve. The upper valve which abuts against a seating shoulder in the valve body, includes a resilient part affixed to the main part of the upper valve by a screw. Repair or replacement of the resilient part is cumbersome without removal of the valve body from the tubular connecting coupling of the pressure container.

The lower valve member is generally movable only a relatively short distance from its valve seat means, whereby even when full open the lower valve member still lies within the tubular connecting coupling. The fluid discharges through the filler valve into the pressure container or tank in a straight stream. It is known that if the volatile fluid, such as LP-gas, is sprayed into the pressure container through the filler valve rather than discharged into the pressure container in a straight stream, the fill rate would be greater. Separate devices have sometimes been attached to the inside of the pressure container or to the filler valve for accomplishing spray filling. Thse separate devices have not been entirely satisfactory and have added to the cost of the installation and, thus, are undesirable.

An object of the present invention is to provide an improved filler valve for a pressure container for a fluid, such as liquefied petroleum gas, which filler valve is provided with first and second seating means for an upper and a lower valve therein, the first seating means comprising a replaceable primary resilient seat ring defining a first seat and an annular shoulder defining a second seat against which the upper valve is adapted to seat when the resilient seat ring is removed for repair or replacement, the resilient seat ring being replaceable without removal of the filter valve from the pressure container.

Another object of the present invention is to provide a filler valve having first and second seating means and first and second valves cooperating with said seating means, said second valve being slidable on an elongated support stem independently of the first valve means, so as to permit long travel away from the second valve seat, and thereby facilitate spray filling of the liquid into the pressure container to which the filler valve is connected. Other objects and advantages of the present invention will be made more apparent hereinafter.

BRIEF DESCRIPTION OF THE DRAWING

A presently preferred form of the present invention is shown in the attached drawing wherein.

DESCRIPTION OF THE PREFERRED EMBODIMENT OF THE INVENTION

Figure 1:
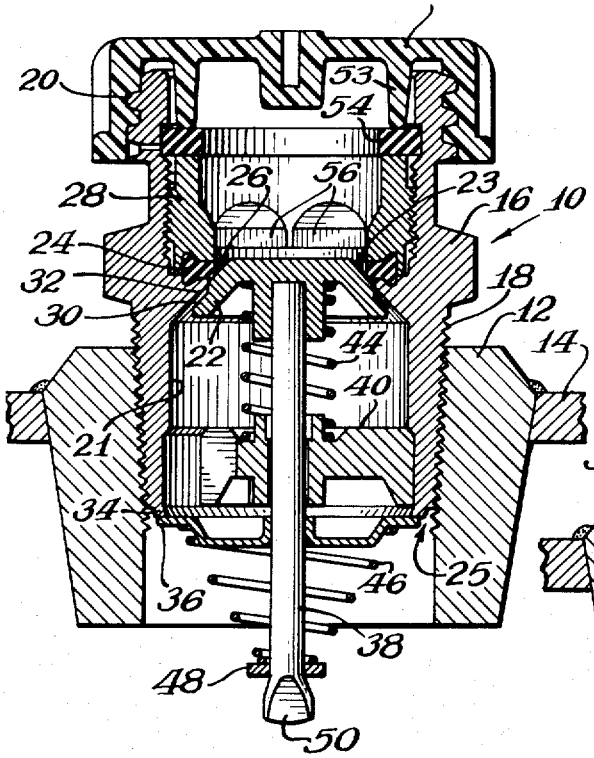
FIG. 1 is a cross-sectional view of a filler valve embodying the preset present invention in place in a pressure container, with the two valves in the filler valve shown closed.
Figure 2:
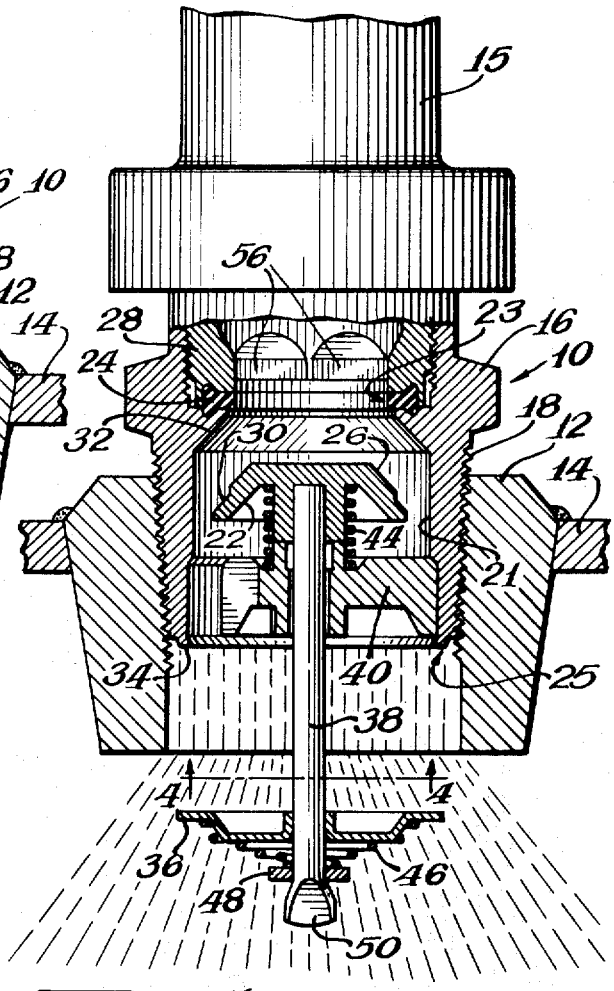
FIG. 2 is a cross-sectional view of a filler valve embodying the present invention in place in a pressure container, with the valves being shown open.

Referring to FIGS. 1 and 2, there is shown a filler valve 10 embodying the present invention in place within the tubular connecting member 12, that is welded or otherwise suitable secured in the top of the pressure tank or container 14.

The filler valve 10 comprises a valve body 16 which may be fabricated from a bar stock part, a forging or a like one-piece body construction. The valve body 16 is provided with external pipe threads at one end as indicated at 18 which are adapted to engage with internal pipe threads in the tubular connecting member 12 to permit threaded connection between the valve body 16 and the tubular connecting member 12. The upper end of the tubular housing or valve body 16 is provided with Acme threads as indicated at 20 for affixation to a suitable conduit or filler connection 15, which may be secured to a source of pressurized fluid adapted to be charged into the container or pressure tank 14. The one-piece body eliminates a seal that w as required between the two halves or sections of prior known valve bodies, one section having the Acme threads thereon and the other section having the pipe threads thereon.

The valve body 16 is provided with first and second setting means 23 and 25 cooperating with first and second valve means. The first seating means 23 which is a adapted to be engaged by a valve member 22 includes a pair of valve seats. The first valve seat or primary seat comprises a resilient annular seat ring member 24 which projects radially inwardly, so that it can be engaged by the frustoconical surface 26 of the valve member 22 for line contact sealing engagement therewith. The resilient seat ring member 24 is removably secured within the valve body 16 by means of a retainer member 28. The resilient ring 24 provides a primary seal with the valve member 26. In the event that the resilient ring is removed for repair or replacement, then, a second valve seat or secondary seat is provided by means of the frustoconical surface 30 on the valve member 22 engaging with the complementary surface 32 of the valve body. By virtue of this construction of the first seating means with both a primary and a secondary seal, it will be evident that if the retaining member 28 should be removed for repair or replacement, the valve 22 will still make a sealing engagement with the valve body and there is no necessity for removal of the filler valve from the tubular connecting member 12.

The second seating means 25 within the valve body 16 are provided by the lower extremity of the valve body 16 as indicated at 34. The second valve member 36 cooperates with the valve seat 34 to prevent backflow of fluid from the pressure container 14.

Figure 4:
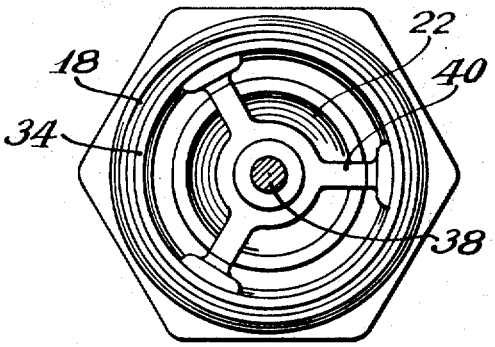
FIG. 4 is a cross-sectional view of the filler valve taken generally along the line 4—4 of FIG. 2.

Considering more specifically the construction and cooperation between the valve members 22 and 36, it noted that secured at its upper end to the valve member 22 is a valve stem 38. The second valve member 36 is slidably supported on the lower portion of the stem 28. The valve stem 38 is guided for sliding movement within a valve stem guide 40 which is suitably secured to the valve body 16 and retained in place for example, as shown in FIGS. 1 and 2 by crimping the end of the valve body 15 inwardly. The valve stem guide 40 is in the form of a central hub and spokes (as will be seen in FIG. 4), so as to provide for fluid through the flow passage 21 defined in the valve body 16.

Disposed between the top of the valve stem guide 40 and the valve member 22 is a spring 44 for biasing the valve 22 to its closed position. A second spring 46 is provided between the lower end of the valve stem 38 and the second valve 36 for biasing the second valve 36 toward its closed position. At its upper end, the spring 46 is adapted to abut the second valve 36 and the lower end of the spring 46 bears upon a washer 48 which is retained in place on the valve stem 38 by suitable fastening means for example, by flattening the end of the valve stem as indicated at 50.

As seen in FIG. 1, the filler valve may be provided with a suitable cap 52 which cooperates with the Acme threads 20 for protecting the threads in shipment and handling of the filler valves and which excludes dirt from entering within the filler valve. The cap 52 further provides an auxiliary seal when the filler valve 10 is not in use. The cap 52 may include a depending flange 53 which is adapted to abut against a washer gasket 54 for maintaining same in place. When the filler valve 40 is to be used, the cap 52 is removed and the conduit or filler connection 15 is secured to the filler valve 10 as indicated in FIG. 2. The conduit or filler connection 25 includes a portion that engages with the threads 20 and another portion which abuts the washer gasket 54, whereby the washer gasket 54 effect a seal between the filler valve body 16 and the filler connection 15 during liquid transfer operations.

For use in filling operation, the cap 52 is removed and the filler connection 15 is secured to the valve body 16 as indicated in FIG. 2. A valve (not shown) in the conduit between the filler connection and the source of fluid to be charged into the pressure tank 14 is opened. The pressure of the fluid will force the first valve member 22 downwardly permitting the flow of fluid through the flow passage 21 in the tubular body 16. The second valve member 36 will be opened and will move downwardly to the position shown in FIG. 2 permitting the pressurized fluid to be discharged in a spray through the tubular connecting member 12 into the tank 14.

The compressed gas industry has for years accepted the fact that, if when filling a pressure container the fluid is made to spray into the tank rather than enter in a straight stream, the filling time would be less. One theory as to why spray filling retards the pressure buildup during a filling operation is that the spray exposes more liquid area to the vapor and picks up vapor and carries it into the liquid. Another theory is that the liquid is cooler than the vapor and the cooler liquid cools the vapor causing it to liquefy. The net result is that by spray filling, vapor pressure buildup is retarded and the faster filling results.

With the arrangement of parts as shown in FIGS. 1 and 2 an extremely long travel of the lower back check valve or second valve 36 is permitted away from the valve seat 34. The valve stem 38 can move downwardly until the bottom of valve member 22 abuts the top of guide 40. Then, the second valve 36 can slide downwardly on the valve stem 38. Such movement of the valve 36 away from seat 34 is much greater than if the valve stem were fixed in the valve body. The longer travel of the second valve 36 away from the seat 34 permits greater flow capacity because the second valve 36 travels beyond the bottom of the connecting member 12. The result of this configuration of filler valve is that a cone-type spray discharge of fluid into the tank is obtained as indicated in FIG. 2.

During filling operation if there should be a loss of pressure, the spring 46 will bias the valve 36 to its second position to prevent the outflow of fluid from the pressure tank 14. The valves 22 and 36 are each opened by the differential pressure acting on the respective valve member to overcome the biasing force of the springs 44 and 46, respectively.

Figure 3:
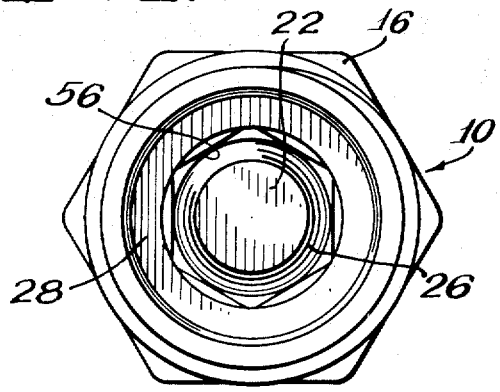
FIG. 3 is a top view of the filler valve with the cap and washer gasket removed.

A feature of the present invention is the construction of the first seating means 23. The primary seal 24 comprise a resilient ring which is readily replaceable without removing the filler valve body 16 from the tubular connecting member 12. The annular retaining member 28 is provided with a non-circular opening 56. As shown in FIG. 3, for example, the opening 56 in retaining member 28 is hexagonal. A hexagonal bar having an external configuration complementary to that of the opening 56 may be inserted into the mating internal hexagonal opening of the disc retainer or retaining member 28 for threading the retaining member 28 out from the valve body 16, thereby exposing the seat ring or valve disc 24 for repair or replacement. Upon removal of the seat ring or disc retainer 28, the valve plug or first valve member 22 will move upwardly and shoulder on the enlarged diameter of the valve plug or first valve 22. The annular frustoconical surface 30 on the valve plus 22 moves into engagement with the seat defined in the shoulder of the valve body. This arrangement provides a secondary or auxiliary sealing function in addition to the sealing function provided by the second valve 36 bearing against the valve seat 34 for reducing the outflow of fluid from the pressure tank to a safe level during the replacement of the seat ring 24.

The washer gasket or seat ring 24 also functions to provide a seal between the retaining member 28 and the valve body.

There has been provided by the present invention an improved filler valve for use with a pressurized fluid or compressed gas such as LP-gas, anhydrous ammonia, or the like. The upper seating means includes a primary seating surface which is formed from a resilient ring member and a secondary or auxiliary seating surface formed by engagement of the first valve member with a shoulder of the valve body. The resilient ring 24 is repairable with the filler valve installed in the pressure tank and with the container under pressure.

The filler valve of the present invention is further constructed and arranged so as to provide for a long travel of the second valve 36 away from its valve seat to provide for spray filling of the pressure tank. The second valve 36 is slidably carried on a valve stem 38, which valve stem 38 is secured at its upper end to a first valve member 22 for movement therewith. The valve stem 38 can be moved so as to fully travel the first valve member away from the first seating means without moving the second valve member 46 from the second seating means 25. The second valve member 46 is movable independently of the first valve member 22. The spring for biasing the second valve member 46 closed is carried below the valve member. Thus, when the filler valve is in operation, the first valve member 22 will be moved downwardly away from its valve seat, causing the valve stem 38 to be moved downwardly.

The second valve member thereby has an extended length of travel along the lower portion of the valve stem. The movement of the valve member 36 is below the tubular coupling 12 and the result is that there is a spray filling of the container. Further, by virtue of the arrangement of the first and second valve members on the stem 38, it is not possible to block the lower back check valve or second valve member 38 open as is sometimes done when it is desired to empty a container. This is a safety feature of the present arrangement of parts in the filler valve 10.

While there has been shown and described a particular embodiment of this invention, it will be obvious to those skilled in the art that various changes and modifications may be made therein without departing from the invention. Therefore, it is intended in the appended claims to cover all such changes and modifications as fall within the true spirit and scope of the invention.

We claim:

1. A filler valve for a pressure container adapted to receive a pressurized fluid comprising a tubular body having a flow passage therethrough, first valve seat means in said body, stem guide means in said body, a valve stem slidable in said stem guide means, a first valve member on one end of the valve stem adapted to cooperate with said first valve seat means *and arranged to open in the direction of fluid flow through said valve passage,* first spring means biasing the first valve member toward seating engagement with the first valve seat means, second valve seat means on said body, a second valve member slidable on said valve stem and adapted to cooperate with said second valve seat means *such that it opens in the direction of fluid flow through said valve passage,* [and]

second spring means biasing the second valve member toward seating engagement with the second valve seat means, [the second spring means being disposed between the second valve member and an end of the valve stem,]

whereby, *during filling,* the valve stem can be moved to [fully] travel the first valve member away from its associated valve seat means [without moving] *a distance corresponding to the resultant force resulting from that force corresponding to the pressure drop across the first valve member and that force resulting from said first spring means, such that* the second valve member *can travel* away from its associated valve means *along said valve stem a distance corresponding to that traveled by said first valve member,* [said first valve seat means comprising a first seat and a second seat, the first valve member being adapted to engage the first set for normal operation, the first seat being removably supported in the body for ease of repair and replacement, the first valve member seating against the second seat when the first seat is removed from the body to provide auxiliary seating] *thereby to permit increased flow capacity and spray filling of the pressure container.*

2. A filler valve as in claim 1, wherein the valve stem is elongated so as to provide for a long travel of the second valve member thereon, whereby the second valve member can be moved from its seated position against the second seat means to a remote position away from the second seat means to permit increased flow capacity and spray filling of the pressure container.

3. A filler valve as in claim 1, wherein the first seat comprises a resilient ring removably retained in the body by a disc retainer, the disc retainer being removably secured to the body, the ring extending inwardly into the flow passage through the body and the first valve member cooperating with the ring to seal the flow passage.

4. A filler valve as in claim 1, wherein the second seat comprises an annular shoulder formed in the body.

5. A filler valve for use with a pressure container having a tubular connection in the top thereof, *the* [a] filler valve comprising a one-piece tubular body having a flow passage therethrough, said body being affixed to said tubular connection, first valve seat means in said body, stem guide means in said body, a valve stem slidable in said stem guide means, a first valve member on one and of the valve stem adapted to cooperate with said first valve seat means *and arranged to open in the direction of fluid flow in said valve passage,* first spring means biasing the first valve member toward seating engagement with the first valve seat means, second valve seat means on said body, a second valve member slidable on said valve stem independently of said first valve member and adapted to cooperate with said second valve seat means *such that it opens in the direction of fluid flow through said valve passage,* [and]

second spring means biasing the second valve member toward seating engagement with the second valve seat means, [the second spring means being disposed between the second valve member and an end of the valve stem,]

said valve stem being elongated so as to provide a long travel of the second valve member thereon, the valve stem being movable, *during filling,* to [fully] travel the first valve member away from its associated valve seat means [without moving] *a distance corresponding to the resultant force resulting from that force corresponding to the pressure drop across said first valve member and that force resulting from said first spring means, such that* the second valve member *can travel* away from its associated valve seat means [,] *a distance corresponding to that traveled by said first valve member, whereby* the second valve member [being movable] *may be moved* from its seated position against the second seat means to a remote position away from the second seat means and below the lower end of said tubular connection to permit spray filling of the pressure container.

6. A filler valve as in claim 5, wherein said first valve seat means comprises a first seat and a second seat, the first seat comprising a resilient ring removably retained in the body by a disc retainer, the disc retainer being removably secured to the body, the ring extending inwardly into the flow passage through the body and the first valve member cooperating with the ring to seal the flow passage, the resilient ring also functioning as a seal between the disc retainer and the valve body.

7. A filler valve for a pressure container adapted to receive a pressurized fluid comprising a tubular body having a flow passage therethrough, first valve seat means in said body, valve stem means slidable in said body, a first valve member on one end of the valve stem means adapted to cooperate with said first valve seat means *and arranged to open in the direction of fluid flow through said valve passage,* first spring means biasing the first valve member toward seating engagement with the first valve seat means, a second valve seat means in said body, a second valve member slidable on said valve stem and adapted to cooperate with said second valve seat means *such that it opens in the direction of fluid flow through said valve passage,* [and]

second spring means biasing the second valve member toward seating engagement with the second valve seat means, whereby, *during filling*, the valve stem can be moved to [fully] travel the first valve member away from its associated valve seat means [without moving] *a distance corresponding to the resultant force resulting from that corresponding to the pressure drop across said first valve member and that force resulting from said first spring means, such that* the second valve member *can travel* away from its associated valve seat means *a distance corresponding to that moved by said first valve member* [, the second spring means being disposed by the second valve member and retaining means on an end of the valve stem].

References Cited

The following references, cited by the Examiner, are of record in the patented file of this patent or the original patent.

UNITED STATES PATENTS

| | | | |
|---|---|---|---|
| 1,040,766 | 10/1912 | Roth | 137—614.2 |
| 1,954,662 | 4/1934 | Bond | 137—614.2 |
| 2,361,866 | 10/1944 | Norway | 137—512.3 |
| 2,951,502 | 9/1960 | Norway | 137—512 |
| 3,283,778 | 11/1966 | Linna | 137—512.3 |
| 3,550,625 | 12/1970 | Adams | 137—614.2 |